(12) United States Patent
Poster

(10) Patent No.: US 10,697,586 B2
(45) Date of Patent: Jun. 30, 2020

(54) SUPPLEMENTAL LUBRICATION PRESSURIZED BY COMPONENT OR RESERVOIR ROTATION

(71) Applicant: Bell Helicopter Textron Inc., Fort Worth, TX (US)

(72) Inventor: Scott David Poster, Arlington, TX (US)

(73) Assignee: BELL HELICOPTER TEXTRON INC., Fort Worth, TX (US)

( * ) Notice: Subject to any disclaimer, the term of this patent is extended or adjusted under 35 U.S.C. 154(b) by 208 days.

(21) Appl. No.: 15/684,920

(22) Filed: Aug. 23, 2017

(65) Prior Publication Data
US 2019/0063677 A1 Feb. 28, 2019

(51) Int. Cl.
*F16N 7/36* (2006.01)
*F16H 57/04* (2010.01)
(Continued)

(52) U.S. Cl.
CPC ............... *F16N 7/363* (2013.01); *F02C 7/36* (2013.01); *F16C 33/6659* (2013.01);
(Continued)

(58) Field of Classification Search
CPC ............. F16H 57/0421; F16H 57/0427; F16H 57/0442; F16H 57/0445; F16H 57/045; F16N 7/363
See application file for complete search history.

(56) References Cited

U.S. PATENT DOCUMENTS 1,991,623 A * 2/1935 Onsrud ............... F16C 33/6677
384/465
3,767,013 A * 10/1973 Caldwell ............... F16C 33/664
184/6.3
(Continued)

FOREIGN PATENT DOCUMENTS

EP 1703174 A1 9/2006
EP 2505878 A1 10/2012
(Continued)

OTHER PUBLICATIONS

EPO Examination Report for EP Application No. 17196022.2 dated May 11, 2018, 7 pages.
(Continued)

*Primary Examiner* — Minh Truong
(74) *Attorney, Agent, or Firm* — Patent Capital Group

(57) ABSTRACT

An example lubrication system for a rotating component has a primary lubrication system providing continuous lubrication during normal operation of the rotating component and secondary lubrication system with a reservoir co-rotating with the component. The reservoir is continuously replenished from the primary lubrication system during normal operation of the rotating system, with the lubricant being forced through a discharge orifice by the centrifugal force generated by the rotation toward, for example, a bearing or a gear. When the primary pressurized lubrication system fails, lubrication will continue to be provided by the lubricant in the supplemental lubricant reservoir while the rotation speed or power supplied to the shaft is controllably decreased in an emergency.

20 Claims, 5 Drawing Sheets

(51) Int. Cl.
*F02C 7/36* (2006.01)
*F16C 33/66* (2006.01)
*F01D 25/18* (2006.01)

(52) U.S. Cl.
CPC ........... *F16H 57/04* (2013.01); *F16H 57/045* (2013.01); *F16H 57/0427* (2013.01); *F16H 57/0442* (2013.01); *F16H 57/0482* (2013.01); *F01D 25/18* (2013.01); *F16C 2360/23* (2013.01); *F16N 2210/12* (2013.01); *F16N 2210/14* (2013.01); *F16N 2260/22* (2013.01); *F16N 2260/32* (2013.01)

(56) References Cited

U.S. PATENT DOCUMENTS

| | | | |
|---|---|---|---|
| 3,951,476 A | | 4/1976 | Schulien et al. |
| 4,429,587 A | * | 2/1984 | Finn, III ............. F16H 57/0447 184/6.12 |
| 4,658,665 A | * | 4/1987 | Strinzel ............... F16H 57/0442 184/6.12 |
| 5,121,815 A | * | 6/1992 | Francois ................. B64C 27/12 184/6.12 |
| 5,183,342 A | | 2/1993 | Daiber et al. |
| 6,082,220 A | * | 7/2000 | Kitagawa ................ F02B 61/02 184/6.11 |
| 6,446,755 B1 | * | 9/2002 | Varailhon ............... B64C 27/14 184/11.2 |
| 7,866,444 B2 | * | 1/2011 | Aldridge ............. F16C 33/6651 184/11.1 |
| 9,328,817 B2 | * | 5/2016 | Yamashita ............ F16H 57/042 |
| 9,765,875 B2 | * | 9/2017 | Sheridan ............. F16H 57/0482 |
| 2006/0062504 A1 | | 3/2006 | Wilton et al. |
| 2014/0030110 A1 | * | 1/2014 | Sinusas .................... F16H 1/14 416/243 |
| 2016/0369887 A1 | | 12/2016 | Sheridan |

FOREIGN PATENT DOCUMENTS

| | | |
|---|---|---|
| EP | 2690318 A1 | 1/2014 |
| EP | 3085998 A1 | 10/2016 |
| EP | 3447267 A1 | 2/2019 |

OTHER PUBLICATIONS

EPO Search Report for EP Application No. 17196022.2 dated Apr. 17, 2018, 4 pages.

* cited by examiner

SUPPLEMENTAL LUBRICATION PRESSURIZED BY COMPONENT OR RESERVOIR ROTATION

TECHNICAL FIELD

This disclosure relates generally to a drive system, and more particularly, though not exclusively, to lubricated bearings, gears, and other components within gearboxes that require continued operation after primary lubrication system failure.

BACKGROUND

In high speed rotating machinery, such as gearboxes, transmissions, aircraft engines, or other rotating parts, containing bearings, shafts, and gears, lubrication by pressurization of the lubricant which flows through jetted orifii directly to the component requiring lubrication is common. External pressure may be applied to the lubricant by using, for example, an oil pump which draws oil from a sump and directs it toward the component. However, situations may occur, for example when the oil pump fails or when oil leaks from the system, such that the primary pressurized lubricant system experiences a severe pressure drop which may cause the components to seize or get damaged, which may sometimes be catastrophic.

It would therefore be desirable and advantageous to provide supplemental lubrication in the event of a catastrophic failure of the primary pressurized lubrication system.

SUMMARY

This disclosure relates generally to the lubrication of rotating components, such as shaft bearings and gears. According to one aspect of the present disclosure, a supplemental lubricant reservoir is arranged inside the shaft and rotates at shaft speed. The reservoir is filled with a lubricant of desired viscosity from the primary pressurized lubrication system, with the lubricant being forced by the centrifugal force generated by the shaft rotation toward the bearing, for example an inner bearing ring, arranged outside the shaft through a discharge channel, such as a metered orifice. The lubricant in the supplemental lubricant reservoir is continuously replenished from the primary pressurized lubrication system during normal operation of the rotating system. When the primary pressurized lubrication system fails, lubrication will continue to be provided by the lubricant in the supplemental lubricant reservoir while the rotation speed of the shaft is controllably decreased and ultimately stopped following an emergency shutdown of the rotating system. According to another aspect of the present disclosure, a supplemental lubricant reservoir is arranged outside a first shaft (for example a drive shaft) of a gearbox and rotates at shaft speed. A second shaft (for example a driven shaft) is connected to the first shaft by a gear which requires lubrication. The reservoir is filled with lubricant of desired viscosity from the primary pressurized lubrication system, with the lubricant being forced toward the gear by the centrifugal force generated by the rotation of the first shaft through a discharge channel, such as a metered orifice, for example in form of a mist. The lubricant in the supplemental lubricant reservoir is continuously replenished from the primary pressurized lubrication system during normal operation of the rotating system. When the primary pressurized lubrication system fails, lubrication of the gears will continue to be provided by the lubricant in the supplemental lubricant reservoir while the rotation speed or power requirements of the first shaft is controllably decreased following an emergency shutdown of the rotating system to a safe rotation speed where continuous lubrication is no longer required and ultimately stopped. It will be understood that the roles of the first and second shaft may be reversed.

According to yet another aspect of the present disclosure, lubrication systems with supplemental rotating lubricant reservoirs are utilized in or around the rotor mast and in a gearbox of the tail rotor of a rotorcraft, such as a helicopter, to prevent the rotating rotor mast and the gears in the gearbox from failure to transmit torque or seize, thus allowing a controlled landing of the rotorcraft in the event of a failure of the pressurized primary lubrication system.

DETAILED DESCRIPTION

Figure 1:
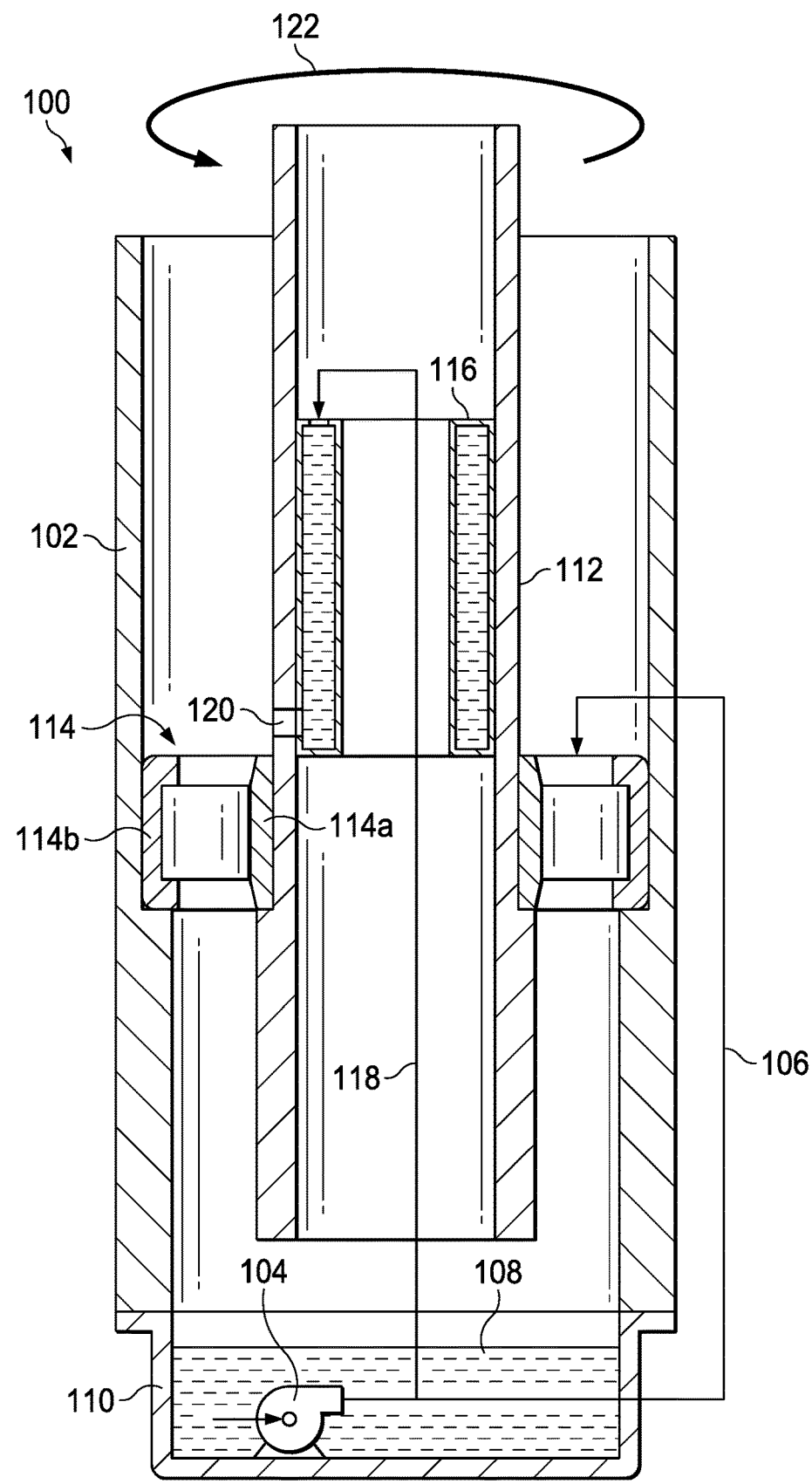
FIG. 1 illustrates schematically an example rotating shaft with an external pressurized primary lubrication system for a bearing and a supplemental rotating lubricant reservoir in accordance with certain embodiments.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming, it would nevertheless be a routine undertaking for those of ordinary skill in the art having the benefit of this disclosure.

In this specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above," "below," "upper," "lower," "spaced-apart" or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction.

Further, the present disclosure may repeat reference numerals and/or letters in the various examples. This repetition is for the purpose of simplicity and clarity and does not in itself dictate a relationship between the various embodiments and/or configurations discussed.

Example embodiments that may be used to implement the features and functionality of this disclosure will now be described with more particular reference to the attached FIGURES.

FIG. 1 illustrates an example embodiment of a system 100 with a shaft 112 supported for rotation in a housing 102 by at least one bearing 114. The bearing 114 has an inner race 114a connected to the shaft 112 and an outer race 114b that may be connected to the housing 102. The housing may be closed off at the bottom, wherein a lubricant 108, such as oil, is collected at the bottom forming an oil pan or a sump 109. In the illustrated example, the bearing 114 may be supplied with the pressurized lubricant 108 by an oil pump 104 through a supply line 106, wherein the inlet of pump 104 draws oil from the oil pan 110. It will be understood that the pump 104 may be arranged inside or outside the housing 102. Throughout the specification, the terms lubricant and oil as well as sump and oil pan, respectively, may be used interchangeably.

FIG. 1 furthermore shows a supplemental lubricant reservoir 116 disposed inside the shaft 112 and co-rotating with the shaft 112. Lubricant 108 is continuously supplied to the supplemental lubricant reservoir 116 from the sump 110, in the illustrated example system 100 through a supplemental feed line 118 which keeps the supplemental lubricant reservoir 116 filled during normal operation, i.e. when lubricant is conveyed to the primary lubrication system by pump 104. Pressure generated by the centrifugal force as a result of the shaft rotation indicated by arrow 122 continuously conveys a small, optionally metered amount of lubricant from the supplemental rotating lubricant reservoir 116 through an orifice 120 to the bearing 114, preferably to an inner bearing race 114a.

Oil pumps may have different designs. For example, twin gear pumps (also called external pumps) may be mounted inside the oil pan near the bottom section of the shaft 112 and use a pair of intermeshing gears to pump oil. The pump gears turn in opposite directions. This traps oil between the gear teeth and carries it around the outside of each gear from the pickup tube inlet to the pump outlet. The tight clearances between the gears prevent the oil from flowing backwards to the inlet. Another type of oil pump is a rotor pump (also called "gerotor" pump) that has an inner gear that turns inside an outer rotor. The inner gear has one less lobe than the outer rotor. The inner gear is also mounted slightly off-center to the outer rotor which forces the outer rotor to spin at about 80% of the speed of the inner gear. This creates a bellows-like pumping action that pulls oil from the inlet port and pushes it towards the outlet port. Close tolerances are required for good pumping efficiency. This type of pump may also be located in the sump. Another type of oil pump is a so-called cover oil pump usually located in or on a cover of the rotating system 100. When this type of pump becomes worn, it is hence not always necessary to replace the entire cover assembly, provided the pump housing inside the cover is not worn or damaged. A new drive gear can be mounted on the shaft and a new rotor installed in the cover to rejuvenate the pump without complete disassembly. These types of oil pumps are frequently used in automotive engines and other drive aggregates, so that there design and operation will not be described further.

Upon rotation of shaft 112 the generated centrifugal force creates a pressure on lubricant 108 within reservoir 116 as follows:

$$\Delta P = \frac{\rho}{2g}(R_0^2 - R_1^2) * \omega^2,$$

wherein $\Delta P$=outlet pressure difference between pressure at orifice 120 and lubricant supply pressure,
$\rho$=lubricant density,
g=gravitational constant (981 cm/sec²),
$R_0$=outlet radius at orifice 120,
$R_1$=inner radius at lubricant supply pressure,
$\omega$=shaft rotation speed (rad/sec).

When the pressurized primary lubricant supply through line 106 fails, the lubricant supply pressure drops to zero so that the outlet pressure at orifice 120 is produced only by the rotation of shaft 112. Failure of the primary lubricant system may be detected by an (unillustrated) oil pressure sensor, causing an emergency shutdown of the shaft rotation by rapidly reducing the shaft rotation speed or power requirement of 122. As a result of a speed change, the flow rate through orifice 120 decreases during this time which also gradually decreases the pressure $\Delta P$ while still supplying an adequate quantity of lubricant to the components that require continuous lubrication, such as shaft bearing 114. It will be understood that the oil capacity of the supplemental lubricant reservoir and the shutdown of the shaft rotation need to be carefully matched so that the bearing 114 does not run dry.

Figure 2:
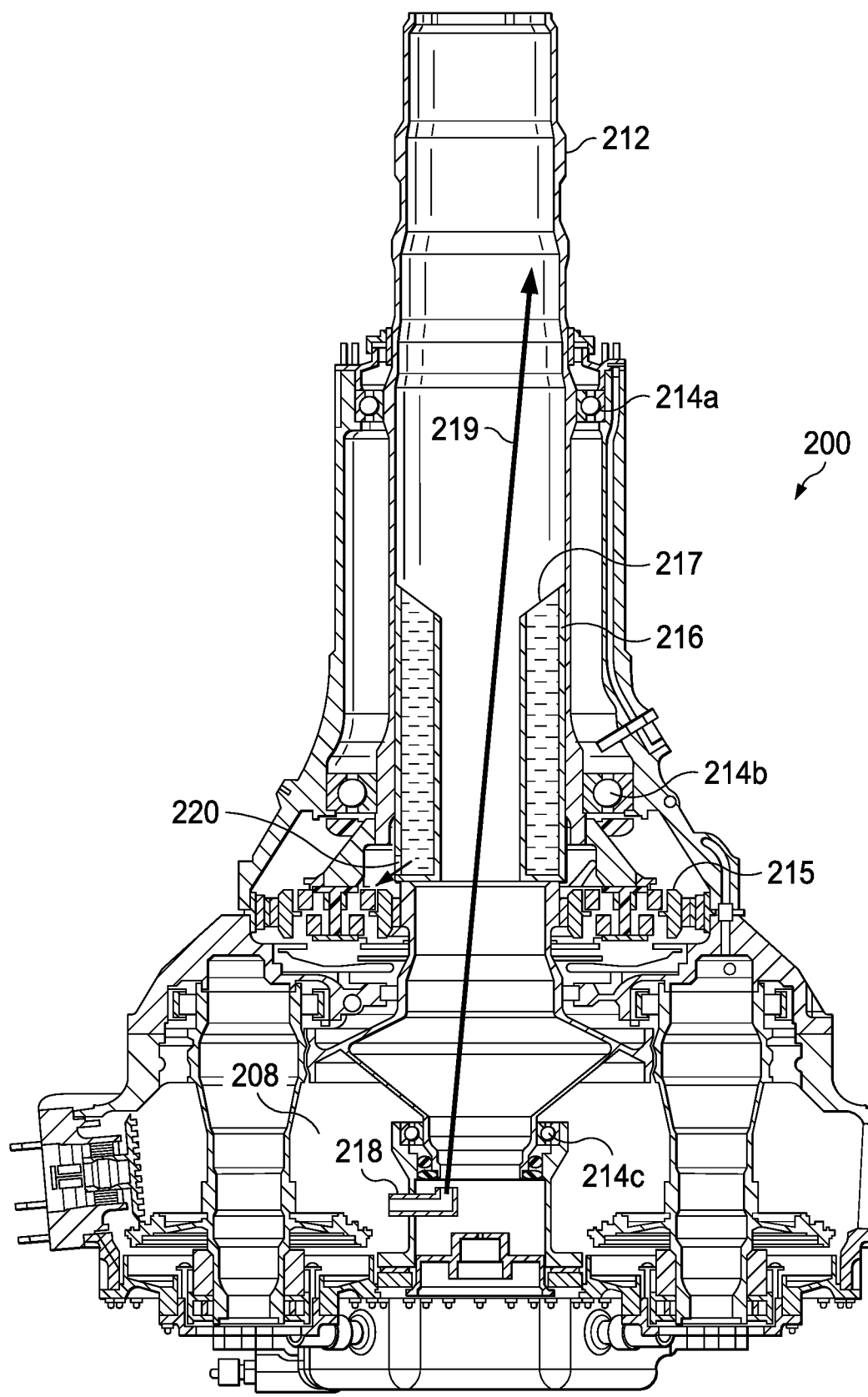
FIG. 2 illustrates schematically an example embodiment of a rotating shaft with a supplemental rotating lubricant reservoir fed by an oil jet during normal operation in accordance with certain embodiments.

FIG. 2 shows an embodiment according to the disclosure of a system 200 with a rotating mast 212 of an otherwise unillustrated rotorcraft. The mast 212 may support, for example, the main rotor of the rotorcraft. Shown in FIG. 2 are only those components that are part of the bearing, gear and lubrication system. As described above with reference to FIG. 1, the system 200 includes a pressurized primary lubrication system with an oil pan or sump 208 and a supplemental rotating lubrication system with a supplemental reservoir 216 co-rotating with the mast 212. The mast is supported for rotation in a housing (not explicitly shown) by bearings 214a, 214b, which require lubrication while the mast 212 rotates. Also schematically illustrated is a planetary gear 215 which may be used to transmit a rotary motion to the mast 212.

During normal operation, all bearings and gears are lubricated by a lubricant fed from the pressurized primary lubrication system. Additionally, an oil injection tube 218 with an inlet connected to the pressurized primary lubricant supply and an outlet in form of an orifice, shooting an oil jet 219 upwards through the hollow mast 212 to strike the inside of the hollow mast 212 above the entrance opening 217 of the supplemental reservoir 216. As a result of the centrifugal force generated by the rotation of the mast 212, the lubricant then flows along the inside wall of the mast 212 and drips down into the reservoir 216. The oil surface at the entrance opening 217 forms a concave meniscus when the mast 212 rotates. Pressure generated by the centrifugal force as a result of the shaft rotation continuously conveys a small, optionally metered amount of lubricant from the supplemental lubricant reservoir 216 through an orifice 220 to the exemplary planetary gear 215. This ensures that the lubricant in the supplemental reservoir is continuously recycled or replenished during normal operation, i.e. when lubrication is provided by the pressurized primary lubrication system.

When the pressurized primary lubricant supply fails, hydraulic pressure at the orifice 220 is produced only by the rotation of mast 212. This ensures that a sufficient quantity of lubricant continues to flow to the example planetary drive 215. Additional unillustrated orifices and flow passages may be arranged to feed lubricant to the bearings 214a, 214b, and other locations requiring continuous lubrication.

Figure 3:
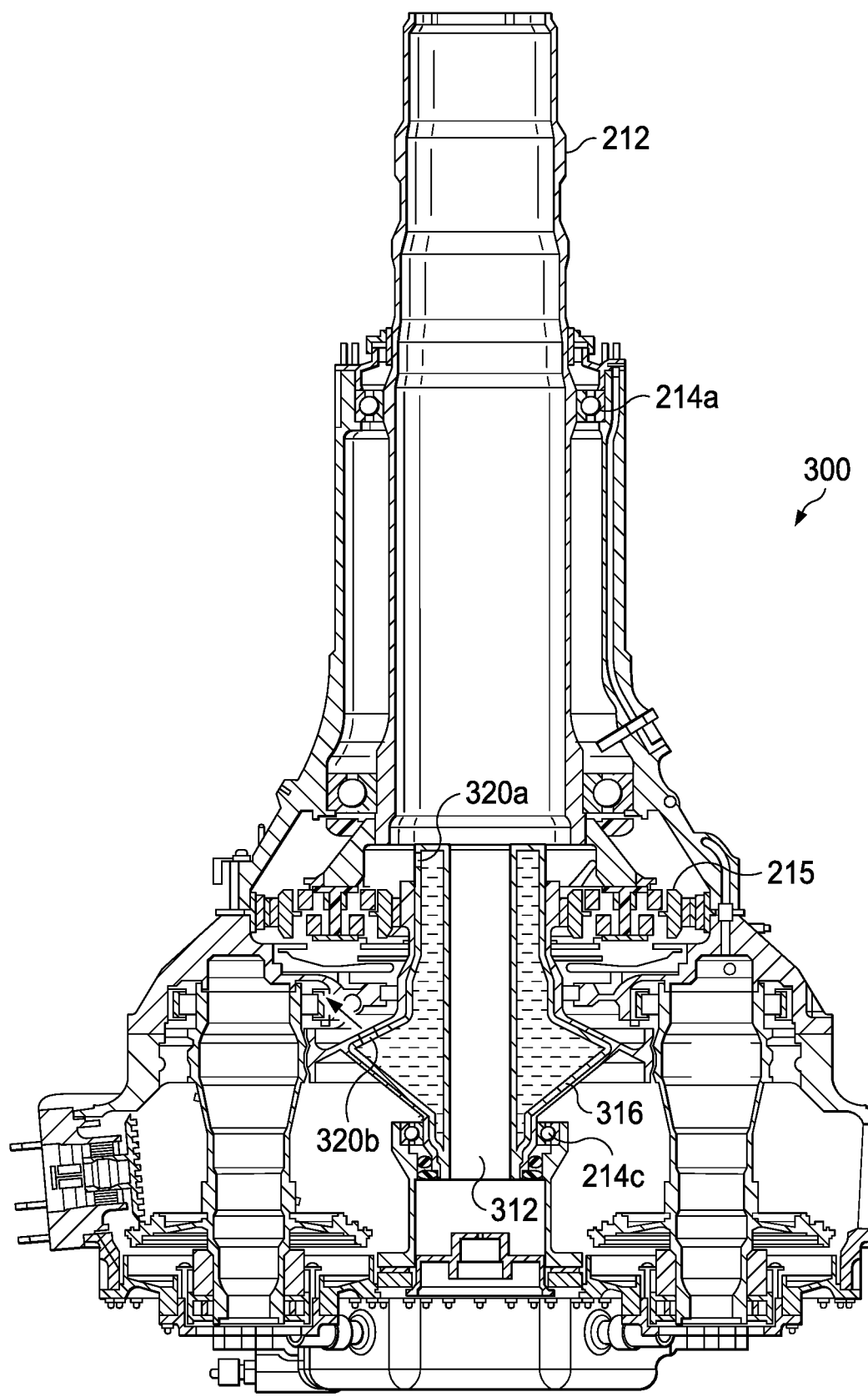
FIG. 3 illustrates schematically another example embodiment of a rotating shaft with a supplemental rotating lubricant reservoir fed by the primary lubrication system during normal operation in accordance with certain embodiments.

Turning now to FIG. 3, FIG. 3 shows a different arrangement of a rotating supplemental reservoir 316 which co-rotates with a lower shaft 312 operatively connected to the planetary gear 215. The lower shaft 312 may for example have a rotation speed different from that of mast 212. Metered orifices 320a, 320b feed lubricant to, for example, the planetary gear 215, the bearing 214c and other gears housed in the part of an unillustrated housing enclosing shaft 312. It will be understood that both embodiments of the supplemental reservoirs 216 and 316 may be used severally or in combination to supply lubricant to essential components that require continuous lubrication until all rotating components come to a complete stop in the event of an emergency shutdown or at least attain a safe rotation speed where external lubrication may no longer be necessary.

Figure 4:
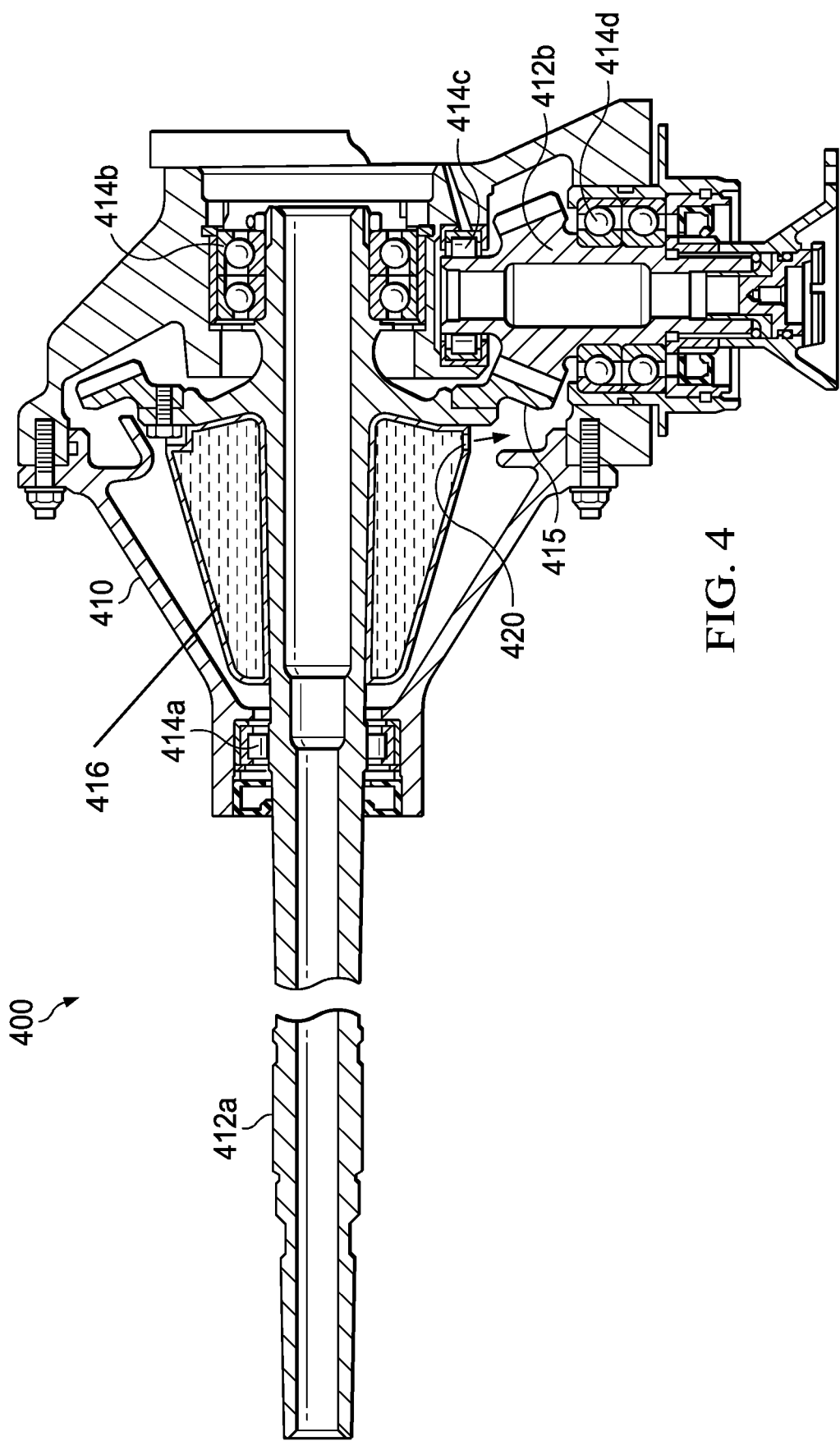
FIG. 4 illustrates schematically an example embodiment of a gearbox with a supplemental rotating lubricant reservoir arranged externally on a rotating shaft in accordance with certain embodiments.

Another embodiment of a supplemental rotating reservoir is illustrated in FIG. 4, wherein the supplemental rotating reservoir 416 co-rotating with a first rotating shaft 412a is arranged outside the first rotating shaft 412a. The first rotating shaft 412a may be for example a drive shaft and a second shaft 412b a driven shaft. Both shafts 412a, 412b are housed inside a gearbox 410 and connected by a gear 415. Shaft 412a may be supported for rotation by bearings 414a, 414b, while shaft 412b may be supported for rotation by bearings 414c, 414d. The supplemental rotating reservoir 416 is constantly fed with optionally filtered oil from the primary gearbox lubrication system. The oil in the reservoir 416 continuously flows through one or more metered openings 420 (only one opening is shown) and is replenished until the primary gearbox lubrication system fails and no longer has the pressure to feed the reservoir 416. In this case, an oil mist that lubricates all components requiring continuous lubrication is the fed from the supplemental rotating reservoir into gearbox 410 through the metered orifice(s) due to pressure generated by the centrifugal force caused by the rotation of shaft 412a and reservoir 416.

Figure 5:
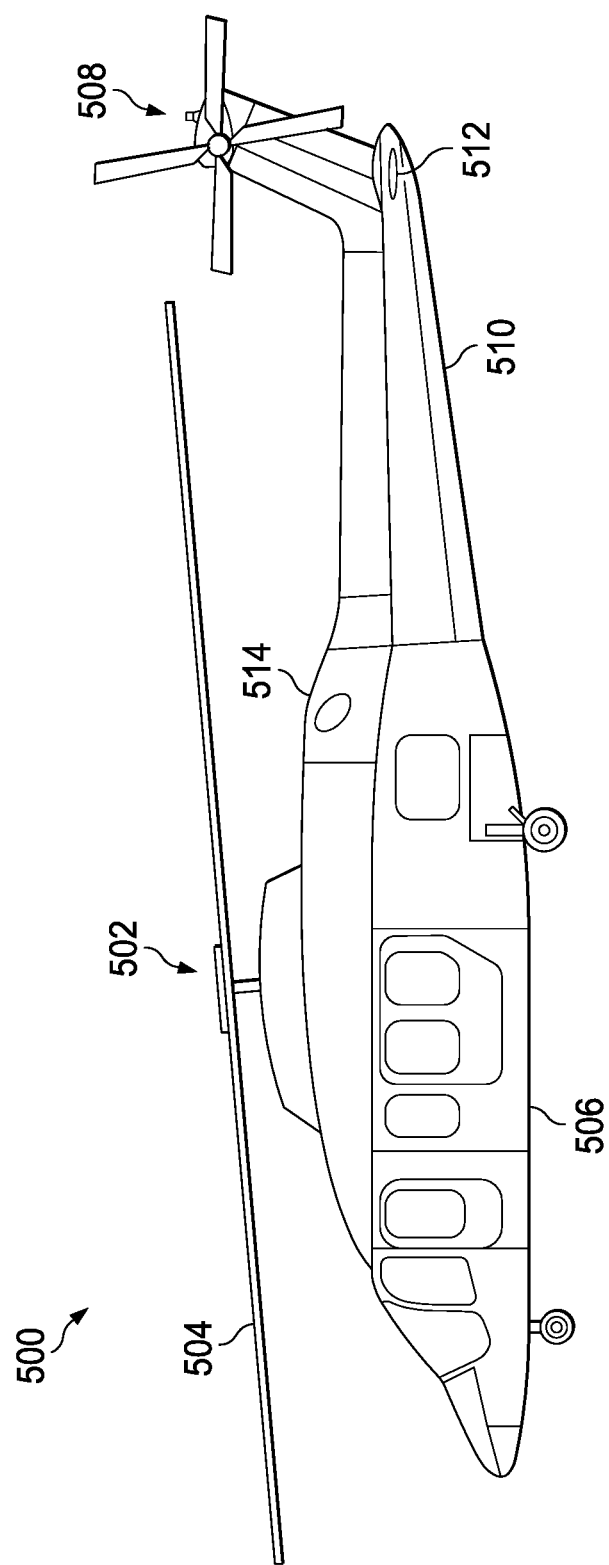
FIG. 5 illustrates an example rotorcraft in accordance with certain embodiments.

FIG. 5 illustrates an example embodiment of a rotorcraft 500, in which the systems described above with reference to FIGS. 1 to 4 may be employed. The illustrated example portrays a side view of the rotorcraft 500. The rotorcraft 500 includes a rotor system 502 with a plurality of rotor blades 504. The pitch of each rotor blade 504 can be managed or adjusted in order to selectively control direction, thrust, and lift of rotorcraft 500. The rotorcraft 500 further includes a fuselage 506, a tail rotor or an anti-torque system 508, an empennage 510, and a tail structure 512. In the illustrated embodiment, the tail structure 512 may also include a horizontal stabilizer. Torque is supplied to the rotor system 502 and to the anti-torque system 508 using at least one engine (not shown) which may be housed under a variety of cowling assemblies 514 configured to cover components of the rotorcraft and to reduce aerodynamic drag. The rotor system may be supported by a mast 212 of the type illustrated in FIGS. 2 and 3, respectively, which employs the lubrication system with a supplemental rotating lubricant reservoir, as described above. The tail rotor or an anti-torque system 508 may be driven, for example, by the drive shaft 412a and the driven shaft 412b operatively connected by an interposed gearbox 410 of the type illustrated in FIG. 4, which also includes a supplemental rotating lubricant reservoir.

It should be appreciated that rotorcraft 500 of FIG. 5 is merely illustrative of a variety of aircraft and machinery that can be used to implement embodiments of the present disclosure. Aircraft implementations may also include, for example, fixed wing airplanes, hybrid aircraft, tiltrotor aircrafts, unmanned aircraft, gyrocopters, a variety of helicopter configurations, and drones, among other examples. Moreover, it should be appreciated that even though aircrafts are particularly well suited to implement embodiments of the present disclosure, the described embodiments can also be implemented using non-aircraft vehicles and devices.

The diagrams in the FIGURES illustrate the architecture, functionality, and operation of possible implementations of the present disclosure. Although several embodiments have been illustrated and described in detail, numerous other changes, substitutions, variations, alterations, and/or modifications are possible without departing from the spirit and scope of the present invention, as defined by the appended claims. The particular embodiments described herein are illustrative only, and may be modified and practiced in different but equivalent manners, as would be apparent to those of ordinary skill in the art having the benefit of the teachings herein. Those of ordinary skill in the art would appreciate that the present disclosure may be readily used as a basis for designing or modifying other embodiments for carrying out the same purposes and/or achieving the same advantages of the embodiments introduced herein. For example, certain embodiments may be implemented using more, less, and/or other components than those described herein. Moreover, in certain embodiments, some components may be implemented separately, consolidated into one or more integrated components, and/or omitted.

Although certain embodiments have been described with reference to a components found in a rotorcraft, the embodiments are not limited to rotorcrafts but may also be used in other types of machinery that uses rotating parts requiring continuous lubrication during their normal operation.

Numerous other changes, substitutions, variations, alterations, and modifications may be ascertained to one of ordinary skill in the art and it is intended that the present disclosure encompass all such changes, substitutions, variations, alterations, and modifications as falling within the scope of the appended claims.

What is claimed is:

1. A lubrication system for a substantially vertically installed rotating component constructed as a hollow shaft, comprising:
 a primary lubrication system comprising a lubricant pump and continuously supplying a lubricant to the rotating component independent of rotation of the rotating component; and
 a secondary lubrication system arranged inside the rotating component and comprising a lubricant reservoir having an outer wall of the rotating component and an inner wall and a closed bottom and defining an enclosed volume, wherein the lubricant reservoir co-rotates with the rotating component about a substantially vertical axis and receives lubricant from the primary lubrication system at a top opening and discharges a metered quantity of the lubricant through an orifice disposed proximate to the bottom of the lubricant reservoir, wherein when the primary lubrication system fails to supply the lubricant to the rotating component, a centrifugal force generated by rotation of the rotating component and acting on the lubricant in the co-rotating lubricant reservoir pushes the metered quantity through the orifice and supplies the metered quantity of the lubricant to the rotating component while the rotation of the rotating component is controllably decreased and ultimately stopped.

2. The lubrication system of claim 1, wherein the lubricant reservoir of the secondary lubrication system is sized so as to supply the metered quantity of the lubricant to the rotating component while the rotation speed of the shaft is controllably decreased.

3. The lubrication system of claim 1, wherein the rotating component is supported for rotation by a bearing comprising an inner race connected to the rotating component and an outer race connected to a housing, with the metered quantity of the lubricant being conveyed to the inner race through the orifice.

4. The lubrication system of claim 1, wherein the rotating component is supported for rotation in a housing by at least one bearing.

5. The lubrication system of claim 4, wherein the housing is closed off at a housing bottom forming an oil pan or a sump.

6. The lubrication system of claim 5, wherein the lubricant pump draws lubricant from the oil pan or sump.

7. The lubrication system of claim 4, wherein the lubricant pump is arranged inside the housing.

8. The lubrication system of claim 5, wherein the lubricant is continuously supplied to the lubricant reservoir from the oil pan or sump through a supplemental feed line which keeps the lubricant reservoir filled during normal operation.

9. A method for lubricating a substantially vertically installed rotating component constructed as a hollow shaft, the method comprising:

supplying a lubricant to the rotating component from a primary lubrication system comprising a lubricant pump independent of rotation of the rotating component; and discharging a metered quantity of the lubricant through an orifice disposed proximate to a closed bottom of in a lubricant reservoir defined by an outer wall of the rotating component and an inner wall and the closed bottom of a secondary lubrication system, wherein the lubricant reservoir is arranged inside the rotating component and co-rotates with the rotating component about a substantially vertical axis and receives lubricant from the primary lubrication system at a top opening and, wherein when the primary lubrication system fails to supply the lubricant to the rotating component, a centrifugal force generated by rotation of the rotating component and acting on the lubricant in the co-rotating lubricant reservoir pushes the metered quantity through the orifice and supplies the metered quantity of the lubricant to the rotating component while the rotation of the rotating component is controllably decreased and ultimately stopped.

10. The method of claim 9, wherein the lubricant reservoir of the secondary lubrication system is sized so as to supply the metered quantity of the lubricant to the rotating component while the rotation speed of the shaft is controllably decreased.

11. The method of claim 9, wherein the rotating component is supported for rotation by a bearing comprising an inner race connected to the rotating component and an outer race connected to a housing, with the metered quantity of the lubricant being conveyed to the inner race through the orifice.

12. The method of claim 9, wherein the rotating component is supported for rotation in a housing by at least one bearing.

13. The method of claim 12, wherein the housing is closed off at a housing bottom forming an oil pan or a sump.

14. The method of claim 13, wherein the lubricant pump draws lubricant from the oil pan or sump.

15. The method of claim 12, wherein the lubricant pump is arranged inside the housing.

16. The method of claim 13, wherein the lubricant is continuously supplied to the lubricant reservoir from the oil pan or sump through a supplemental feed line which keeps the lubricant reservoir filled during normal operation.

17. A rotorcraft comprising:

at least one substantially vertically installed rotating component constructed as a hollow shaft, a primary lubrication system comprising a lubricant pump and continuously supplying a lubricant to the at least one rotating component independent of rotation of the at least one rotating component; and a secondary lubrication system arranged inside the rotating component and comprising a lubricant reservoir defined by an outer wall of the rotating component and an inner wall and a closed bottom, wherein the lubricant reservoir co-rotates with the rotating component about a substantially vertical axis and receives lubricant from the primary lubrication system at a top opening and discharges a metered quantity of the lubricant through an orifice disposed proximate to the bottom of the lubricant reservoir, wherein when the primary lubrication system fails to supply the lubricant to the rotating component, a centrifugal force generated by rotation of the rotating component and acting on the lubricant in the co-rotating lubricant reservoir pushes the metered quantity through the orifice and supplies the metered quantity of the lubricant to the rotating component while the rotation of the rotating component is controllably decreased and ultimately stopped.

18. The rotorcraft of claim 17, wherein the lubricant reservoir of the secondary lubrication system is sized so as to supply the metered quantity of the lubricant to the rotating component while the rotation speed of the shaft is controllably decreased.

19. The rotor craft of claim 17, wherein the rotating component is supported for rotation in a housing by at least one bearing.

20. The rotor craft of claim 17, wherein the lubricant is continuously supplied to the lubricant reservoir from the oil pan or sump, keeping the lubricant reservoir filled during normal operation.

* * * * *